(12) United States Patent
Chelminski

(10) Patent No.: US 6,464,035 B1
(45) Date of Patent: Oct. 15, 2002

(54) STREAMLINED, READILY TOWABLE MARINE SEISMIC ENERGY SOURCE FOR CREATING INTENSE SWEPT-FREQUENCY AND PULSE-CODED SIGNALS IN A BODY OF WATER

(75) Inventor: Stephen Chelminski, Antrim, NH (US)

(73) Assignee: Bolt Technology Corporation, Norwalk, CT (US)

( * ) Notice: Subject to any disclaimer, the term of this patent is extended or adjusted under 35 U.S.C. 154(b) by 53 days.

(21) Appl. No.: 09/711,006

(22) Filed: Nov. 9, 2000

(51) Int. Cl.[7] .................................................. G01V 1/14
(52) U.S. Cl. ....................... 181/120; 181/114; 367/143; 367/75
(58) Field of Search .......................... 181/113–121, 109, 181/110; 367/75, 143

(56) References Cited

U.S. PATENT DOCUMENTS 4,885,726 A * 12/1989 Myers .......................... 181/120
5,128,906 A * 7/1992 Cole ............................. 181/120

* cited by examiner

Primary Examiner—Khanh Dang

(74) Attorney, Agent, or Firm—G. Kendall Parmelee

(57) ABSTRACT

Streamlined, towable, marine seismic energy vibrator for creating intense swept-frequency and pulse-coded seismic signals in a body of water has a sleek, fish-like configuration designed for towing with minimum drag. The vibrator has a streamlined hollow towing head and a streamlined hollow tail head mounted onto front and rear of a long cylindrical tubular wall which is modular, comprising cylinder sections joined in end-to-end axial alignment. Within this long tubular cylinder wall is an axially vibratable multi-piston assembly having a plurality of pistons on a long piston rod. One piston is positioned in each of the cylinder chambers. These chambers hive multiple ports opening out through the long cylindrical wall. An elongated circular cylindrical elastomeric bladder forms a water-filled bladder chamber encircling the wall. An actuator piston is vibrated by a remotely controllably hydraulic circuit, thereby vibrating the multi-piston assembly for vibrating water out and in through multiple ports communicating with the water-filled bladder chamber for vibrating the exterior of the bladder shown having diameter "D" of 18 inches and length "L" of 118.5 inches, providing a 6,700 square inch vibration area contacting the ambient water. A multi-piston position sensor enables synchronization of the vibrator with companion sources being towed. An axial passage in the long piston rod feeds low-pressure compressed air into the cylinder chambers forming air cushions behind the pistons vibrating water in these cylinder chambers.

20 Claims, 5 Drawing Sheets

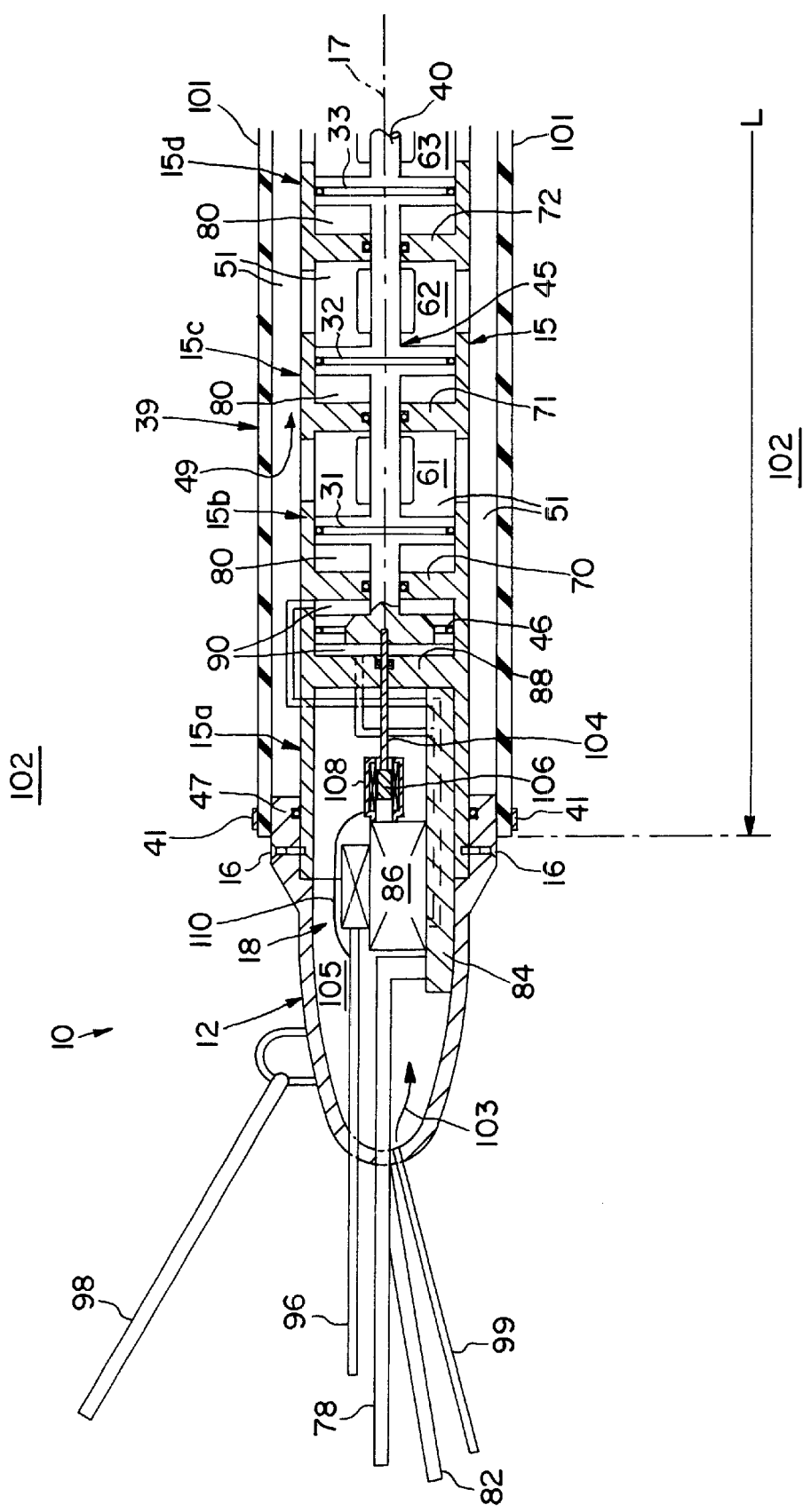
FIG. IA

STREAMLINED, READILY TOWABLE MARINE SEISMIC ENERGY SOURCE FOR CREATING INTENSE SWEPT-FREQUENCY AND PULSE-CODED SIGNALS IN A BODY OF WATER

FIELD OF THE INVENTION

The present invention relates to marine seismic energy sources adapted to be submerged in water aft of a seismic exploration vessel. More particularly, this invention relates to a streamlined, readily-towable marine seismic energy source for creating intense, swept-frequency and pulse-coded seismic signals in a body of water. The illustrative embodiment of the invention is a marine vibratory sound source having a sleek, fish-like configuration designed to be readily towed in the water with a minimum of drag.

BACKGROUND

There are prior vibratory-type marine seismic energy sources, but such equipment has been heavy, bulky, clumsy and awkward to deploy behind a seagoing vessel.

Certain prior hydraulically-actuated vibratory marine seismic energy sources were attempted to be mounted directly on the stern of a seagoing vessel. However, action/reaction forces generated by such stern-mounted, hydraulically-driven, vibratory, seismic energy equipment produced troublesome, disturbing and undesirable vibrations involving stern portions of the vessel itself. Such vibrations became severe in structural members, panels, braces and the like which happened to be vibrationally resonant with fundamental and/or harmonic (overtone) frequencies generated by a large, stern-mounted, powerful, hydraulically-driven vibratory seismic energy source.

Attempts to use prior vibratory seismic energy sources separated from the vessel itself and being towed through a body of water behind the vessel have experienced considerable difficulties. Their heavy weight and bulk have made them difficult to lift from shipboard over the stern and then lower into the water for deploying them. They similarly were difficult to retrieve from the water to return them onto shipboard.

Furthermore, large cross-sectional areas of prior marine seismic vibratory apparatus, i.e., their frontal areas, produced unacceptably large drag forces through water, thereby tugging backward against forward motion of towing vessels. Undesirable consequences of large drag forces are unduly large stresses in towing gear and wasteful large consumptions of fuel used in propelling towing vessels.

SUMMARY OF THE DISCLOSURE

A sleek, low-drag-towable, vibrator marine seismic energy source for generating and propagating into a body of water intense, swept-frequency and pulse-coded sound energy signals.

Among numerous advantages provided by the illustrative embodiment of the invention are those resulting from its dramatically large vibration-coupling surface area in contact with the body of water. Yet, this large vibrational-coupling area is achieved while also designing a low-drag configuration.

The vibrator source has a streamlined towing head and a streamlined tail head mounted onto front and rear ends of a long cylindrical tubular wall. This wall is modular in construction comprising a plurality of cylinder sections forming cylinder chambers joined in end-to-end axial alignment.

Within these modular cylinder chambers is an axially vibratable multi-piston assembly having a long piston rod with multiple pistons mounted at axially-spaced positions on this long rod. One of these pistons is positioned in each of the cylinder chambers. These chambers have multiple ports opening out through the long cylindrical wall. An elongated circular cylindrical elastomeric bladder encircles the cylindrical wall forming a water-filled bladder chamber around the wall. Also, water fills the cylinder chambers and their ports. The nose of the streamlined towing head projects forward beyond the front end of the bladder, and the streamlined tail head projects aft beyond the aft end of the bladder.

An actuator piston in an actuator cylinder chamber is vibrated hydraulically by a remotely-controlled hydraulic circuit having a servo valve and manifold mounted within the streamlined towing head. Vibration of the actuator piston which is connected to the long piston rod of the multi-piston assembly serves to vibrate all of the pistons, thereby vibrating water from the cylinder chambers out and in through their ports into the water-filled bladder chamber for vibrating the exterior surface of the elastomeric bladder for propagating vibrator seismic energy signals into the surrounding body of water. These vibrator signals are swept-frequency signals and pulse-coded signals.

The bladder as shown has a diameter "D" of 18 inches and a length "L" of 118.5 inches for providing 6,700 square inches of vibrational-coupling area contacting the surrounding water.

These vibrator sources can be made smaller or larger in diameter, for example having an elastomeric bladder with a diameter in the range of about 6 inches to about 36 inches or more.

There are eight vibrator piston chambers shown. The vibrator's modular construction facilitates making such vibrators with more than eight or less than eight vibrator piston chambers, as may be beneficial for usage in various marine seismic exploration and/or surveying applications.

A sensor responds to positioning of the multi-piston assembly in the vibrator for providing a signal to the shipboard controller indicating operating status of the multi-piston assembly for enabling synchronization of the present vibrator with companion vibrators being towed.

An axial passage in the long piston rod feeds low-pressure compressed air into the cylinder chambers for forming air cushions behind these pistons as they are vibrating water in their cylinder chambers. This low-pressure compressed air fills the streamlined towing head. Also, the axial passage extends within the long piston rod to its aft end and opens out into the interior of the tail head for filling the interior of the tail head with low-pressure compressed air.

BRIEF DESCRIPTION OF THE DRAWINGS

The invention, together with further objects, features, aspects and advantages thereof will be more fully understood and appreciated by consideration of the following detailed description in conjunction with the accompanying drawings in which the respective elements, members and assemblies bear the same respective reference numerals throughout the various views.

FIG. 1A is an elevational axial sectional view of the front portion of an elongated, streamlined, readily-towable marine seismic energy source for creating intense swept-frequency signals and/or pulse-coded signals in a body of water.

DETAILED DESCRIPTION OF PREFERRED EMBODIMENT OF THE INVENTION

Figure 1B:
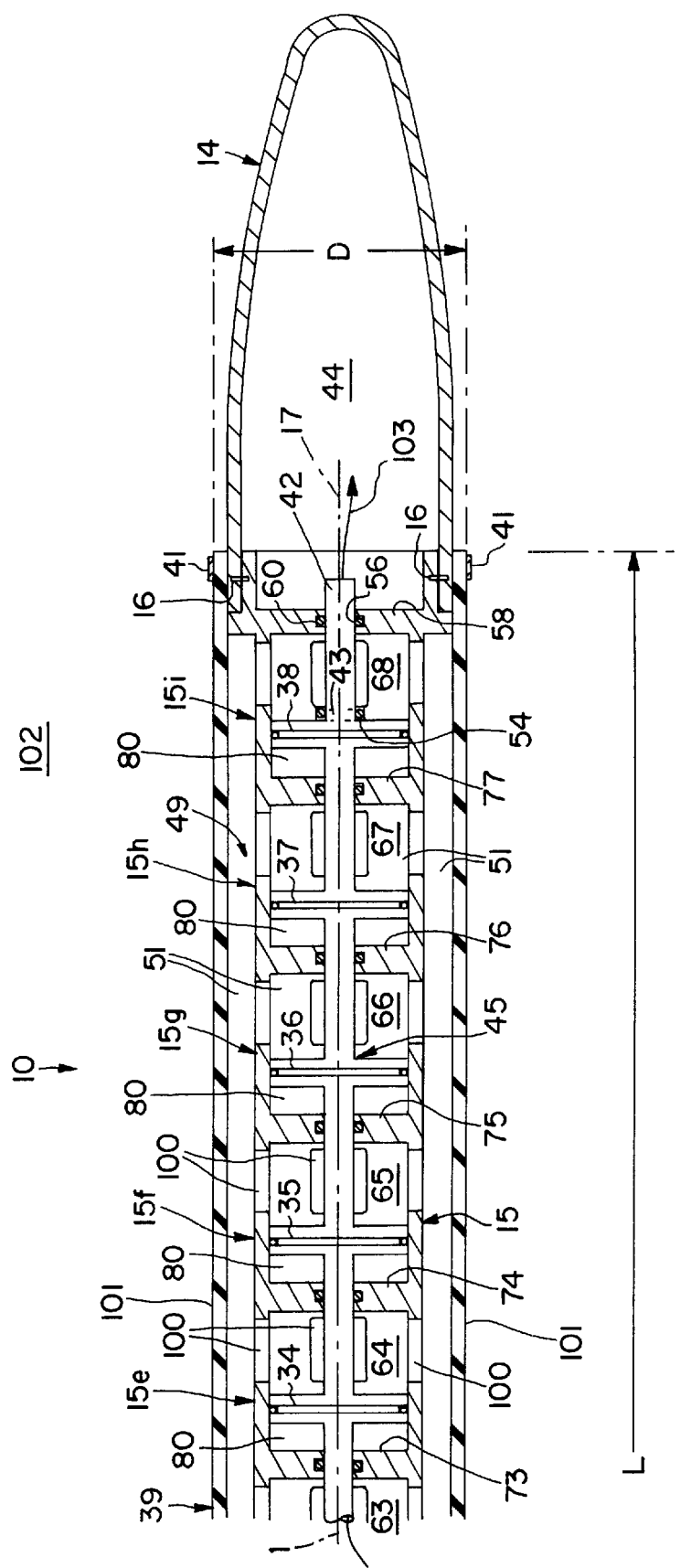
FIG. 1B is an elevational axial sectional view of the streamlined rear portion of the marine seismic energy source whose front portion is shown in FIG. 1A. By positioning FIG. 1B immediately adjacent to FIG. 1A, a viewer will be laying out a complete elevational axial sectional view of this whole energy source.

In the Drawings is shown a vibratory marine seismic energy source indicated at 10 in the four Figures comprising a preferred embodiment of the invention. This vibratory source 10 is elongated, having an overall generally circular cylindrical configuration with a streamlined nose towing head 12, and a streamlined aft tail head 14. These streamlined hollow heads 12 and 14 are suitably removably mounted on the front and aft ends of a long cylindrical tubular wall 15. This long cylinder wall 15 has a longitudinal axis 17 (FIGS. 1A and 1B) extending concentrically therein.

This long cylinder wall 15 is modular in construction comprising a plurality of cylinder sections joined in end-to-end axial alignment. For example, the source 10 as shown comprises sections 15a, 15b, 15c, 15d, 15e, 15f, 15g, 15h and 15i. Except for the front section 15a and the aft section 15i, all of the intermediate modular cylinder sections 15b to 15h are identical in construction. The front tubular section 15a is configured at its forward end for receiving the towing head 12 mounted thereon. Also, this front section 15a is arranged to accommodate therein an assembly 18 of control and operating components to be described later. The aft tubular section 15i is arranged for receiving the tail head 14 mounted thereon.

Within the long tubular cylinder wall 15 is positioned an axially strokable (reciprocatable) multi-piston assembly 45 shown comprising eight vibration-output pistons 31, 32, 33, 34, 35, 36, 37 and 38. These pistons 31 to 38 are circular in configuration being mounted in axially-spaced encircling relationship on one, long, common, piston rod 40 extending along axis 17 in concentric relation through the cylinder wall 15. Thus, this long piston rod extends through all eight cylinder sections 15b to 15i, having its eight pistons positioned in the respective eight cylinder sections, i.e., with one individual piston being in each of these cylinder sections.

Encircling the cylinder wall 15, whose outer surface is a right circular cylindrical surface, is a tubular cylindrical elastomeric hose bladder 39. The forward end of this elastomeric bladder 39 is secured by an encircling hose clamp 41 onto the outer surface of a shoulder 47 (FIG. 2A) on the rear end of the towing head 12. The aft end of this elastomeric bladder 39 is secured by another encircling hose clamp 41 (FIG. 1B) onto the forward end of the tail head 14. A long annular chamber space 49 is defined between the inner surface of bladder 39 and the outer surface of the cylinder body 15. This long annular bladder chamber 49 is filled with water. A legend in FIG. 1B indicates that sea water 51 fills this long bladder chamber 49. Alternatively, fresh water 51 can be used to fill this bladder chamber.

The water 51 within bladder chamber 49 is in communication with the same water which fills eight cylinder chambers 61, 62, 63, 64, 65, 66, 67 and 68. Each such cylinder chamber 61 to 68 is defined fore and aft, respectively, by the rear surface of a vibration-output piston 31 to 38 and the front surface of a respective cylinder wall bulkhead 71, 72, 73, 74, 75, 76, 77 and 58.

As shown by a legend in FIG. 1A, Low Pressure Air Cushions 80 are provided in the cylinder chambers 61 to 68. These air cushions 80 are located between the front surface of respective pistons 31 to 38 and the rear surface of eight respective cylinder wall bulkheads 70 to 77 located in front of these eight pistons. The cylinder wall bulkhead 70 is at the forward end of cylinder chamber 61, i.e., it is positioned in front of the first piston 31.

Operation of the Presently Preferred Embodiment of the Invention:

Before describing in detail other structural features of the vibratory source 10, the specification now will turn attention to describing operation of this source. It is likely to provide a better understanding of and a greater appreciation for this illustrative preferred embodiment of the invention by breaking away from structural description and now turning to operational description.

Figure 3:
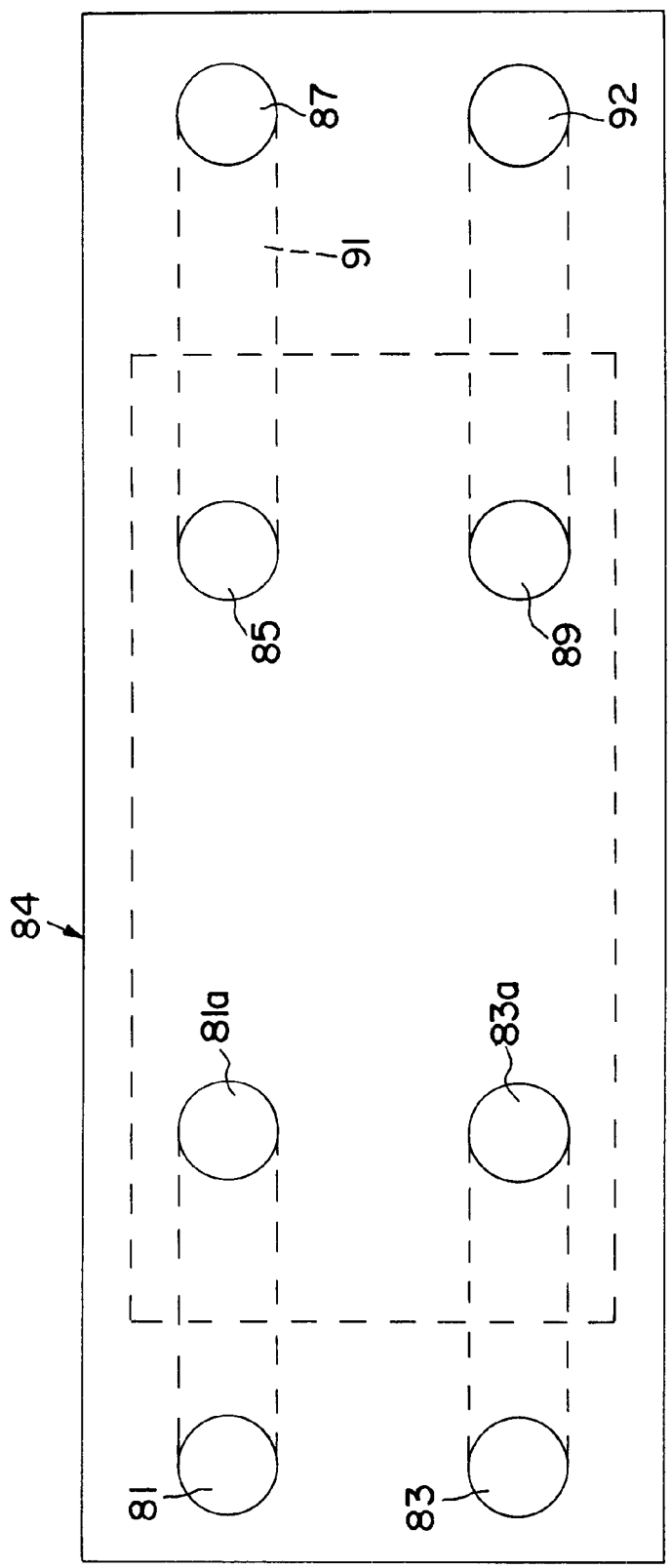
FIG. 3 is an enlarged plan view of a servo valve manifold block, which is seen in side-elevational view in FIGS. 1A and 2A.

On the exploration vessel (not shown) towing the source 10 by a towing cable or chain 98 secured to towing head 12, there is a suitable hydraulic liquid pressure supply. For example, this hydraulic liquid supply comprises a hydraulic pump driven by suitable shipboard equipment, for example being driven by a diesel engine or by an electric motor. This hydraulic pump has an output port and an intake port as is known in the hydraulic art. Its output port provides a supply of hydraulic liquid under high pressure, and its intake port serves as a low-pressure return port. The pump output port communicates via a high-pressure supply hydraulic hose line 78 extending from the towing vessel to a high-pressure hydraulic liquid input port 81 (FIG. 3) in a servo valve manifold 84. This manifold 84 is included in the assembly 18 of control elements housed within the hollow towing head 12. The pump intake port communicates via a low-pressure return hydraulic hose line 82 extending from the towing vessel to a low-pressure return port 83 (FIG. 3) in the manifold 84.

Seated on the manifold 84 is an electrically controllable servo valve 86 having a servo valve input port 81a and a servo valve return port 83a communicating respectively with the input and return ports 81 and 83 in manifold 84. Communication between ports 81 and 81a and between ports 83 and 83a is provided by suitable drilled manifold passages.

Figure 2A:
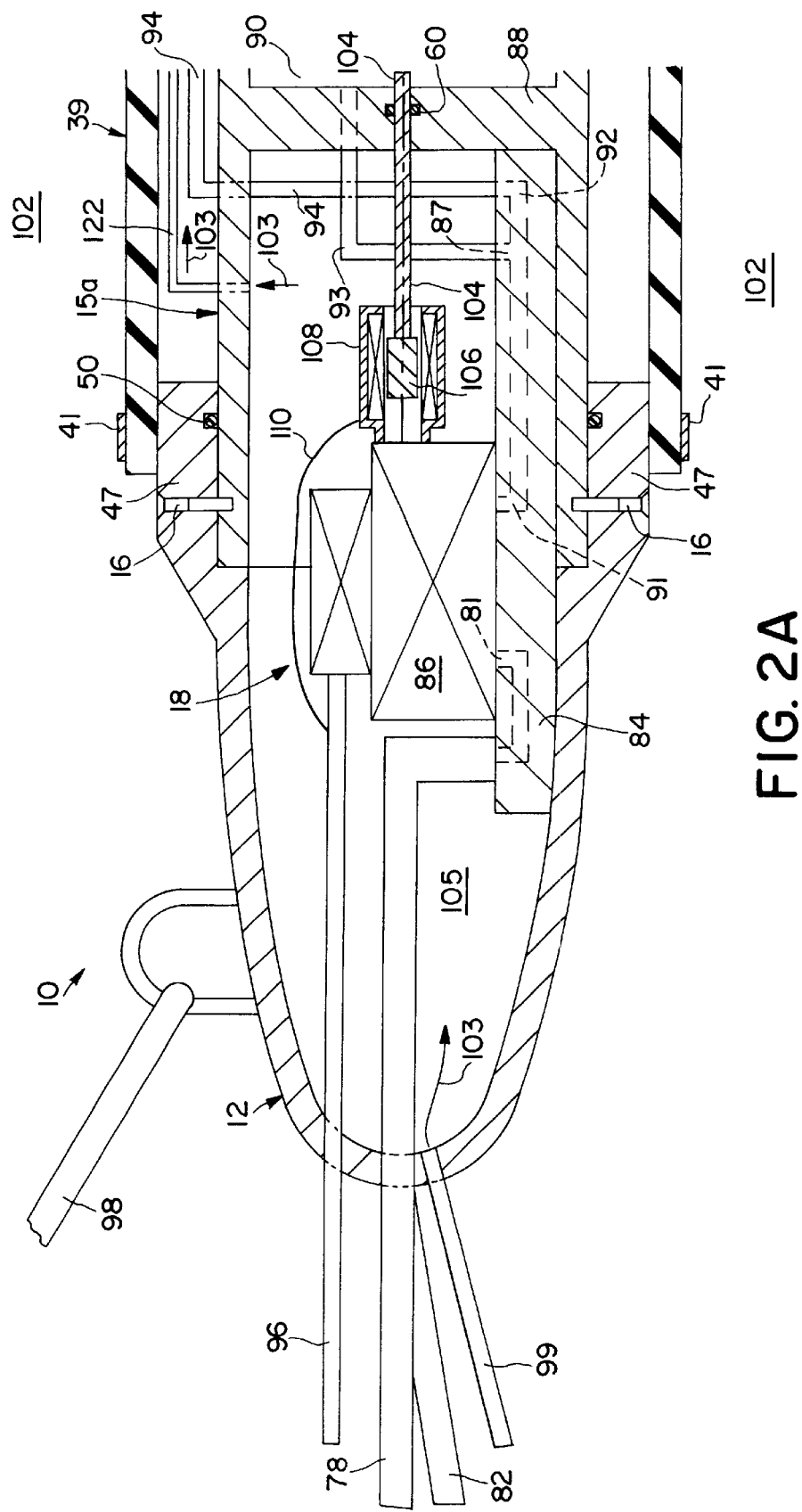
FIG. 2A is an enlarged elevational axial sectional view of the front portion of the marine seismic energy source shown in FIGS. 1A and 1B. This view in FIG. 2A extends from the streamlined nose back to the front portion of an actuator piston cylinder chamber.

The servo valve 86 has first and second operating states, as known in the hydraulic art. In its first operating state, this valve 86 provides communication from the high-pressure input port 81 via servo valve input and output ports 81a and 85, respectively, and through first-passage 91 in the manifold to an output port 87 connected to a first hydraulic line 93 (FIG. 2A). This first hydraulic line 93 communicates through a bulkhead wall 88 in the cylinder section 15a with a front portion of an actuator cylinder chamber 90 containing an actuator piston 46.

Therefore, in this first operating state the servo valve 86 feeds high-pressure hydraulic liquid from input port 81 into the front portion of cylinder 90 for driving the actuator piston 46 in a rearward stroke. Rearward stroking of actuator piston 46 moves the entire multi-piston assembly 45 in a rearward stroke. Simultaneous rearward stroking of eight vibration output pistons 31 to 38 simultaneously expels water outwardly from all eight cylinder chambers 61 to 68 through their respective four circumferentially-spaced output ports 100 (FIG. 1A). Only three of the four output ports 100 are seen in these elevational sectional views. This expelled water issuing simultaneously from thirty-two output ports 100 abruptly increases volume of water 51 within the long annular bladder chamber 49, thereby suddenly enlarging the diameter of elastomeric bladder 39.

In its first operating state, the servo valve 86 also provides communication from the rear portion of actuator cylinder chamber 90 through a second hydraulic line 94 (FIG. 2A) connected to port 92 in the manifold 84 and via valve ports 89 and 83a to the low-pressure return port 83. Thus, as the actuator piston 46 is driven rearwardly, displaced hydraulic liquid escapes from the actuator cylinder 90 via line 94 and manifold port 92 and valve ports 89 and 83a, thereby returning out through low-pressure return port 83 to the low-pressure return line 82.

Conversely, in its second operating state, the servo valve ports 81a and 89 connect high-pressure supply port 81 to manifold output port 92 and through second line 94 with the rear portion of actuator cylinder chamber 90 for driving the actuator piston 46 in a forward stroke. Thereby, all eight of multi-pistons 31 to 38 simultaneously are driven in a forward stroke allowing the bladder 39 to shrink in diameter as water simultaneously rushes inwardly from the long annular bladder chamber 39 through the thirty-two ports 100 into the eight cylinder chambers 61 to 68. Also, in its second operating state, the other two servo valve ports 83a and 85 connect the low-pressure return port 83 to manifold port 87 and the first hydraulic line 93 for allowing hydraulic liquid to be displaced from the front of actuator cylinder chamber 90 through the servo valve and out through low-pressure return line 82.

The servo valve 86 is operated by a shipboard computer-controlled servo valve controller which is connected by an electrical cable 96 extending from shipboard to the servo valve. This control cable 96 is called a vibro control and position sensor cable.

Thus, the servo valve 86 is controlled by the shipboard vibrator control computer which sends electrical signals of predetermined frequencies to the servo valve via the vibro control cable 96. These electrical signals may be swept-frequency signals and/or pulse-coded signals as may be desired. In its operation, the servo valve responds to these signals for regulating the flow of high-pressure hydraulic liquid to the front and rear of the actuator piston 46, causing it to vibrate back and forth axially. The multi-piston assembly 45 is thereby vibrated back and forth axially causing water to vibrate out and in through the multiple ports 100.

Consequently, the cylindrical elastomeric hose bladder 39 vibratorily expands and contracts in diameter, thereby acting as a cylindrical surface 101 radially expanding and contracting in vibrational contact with the surrounding body of water 102. By virtue of the relatively large area of this vibratory surface 101, as will be explained later, intense swept-frequency and/or pulse-coded seismic energy signals are generated and propagated into the surrounding body of water 102.

Attached to the actuator piston 46 and extending forwardly through the bulkhead 88 is an axially movable, non-magnetic shaft 104 attached to an axially movable magnetically permeable slug 106 of ferromagnetic material. This slug 106 is positioned concentrically within a position-sensing coil 108. This coil 108 is energized with a suitable alternating current signal for example having a frequency of about 40,000 Hz fed from cable 96 through a wire line 110. Thus, changes of the axial position of slug 106 within sensing coil 108 changes inductance of this coil, thereby providing a position sensing signal. The purpose of this position-sensing coil is to keep the shipboard computerized servo valve controller informed as to the position of the multi-piston assembly 45 for enabling synchronization of the vibratory source 10 with other such vibratory seismic energy sources also being towed by the vessel.

Also on shipboard is a source of low pressure air, for example a shop-air compressor feeding into a compressed air storage tank with a manually adjustable output pressure regulator valve, such as is used for supplying compressed air for filling vehicular pneumatic tires. The low-pressure air supplied by this source is set at a suitable pressure, for example within a range of about 35 pounds per square inch (psi) to about 115 psi. This low-pressure air 103 is fed from shipboard to the source 10 through a low-pressure air supply hoseline 99 connected into the chamber 105 within towing head 12 for supplying low-pressure air 103 into chamber 105. The towing head 12 has suitable waterproof seals, as known in marine seismic surveying art, where the cable 96 and hose lines 78, 82 and 99 enter this head 12.

Other features, aspects and advantages of operation of the source 10 will be included in or understood from the following resumed detailed description of the system, structure, and assembly techniques employed in the vibratory marine seismic energy source 10.

Figure 2B:
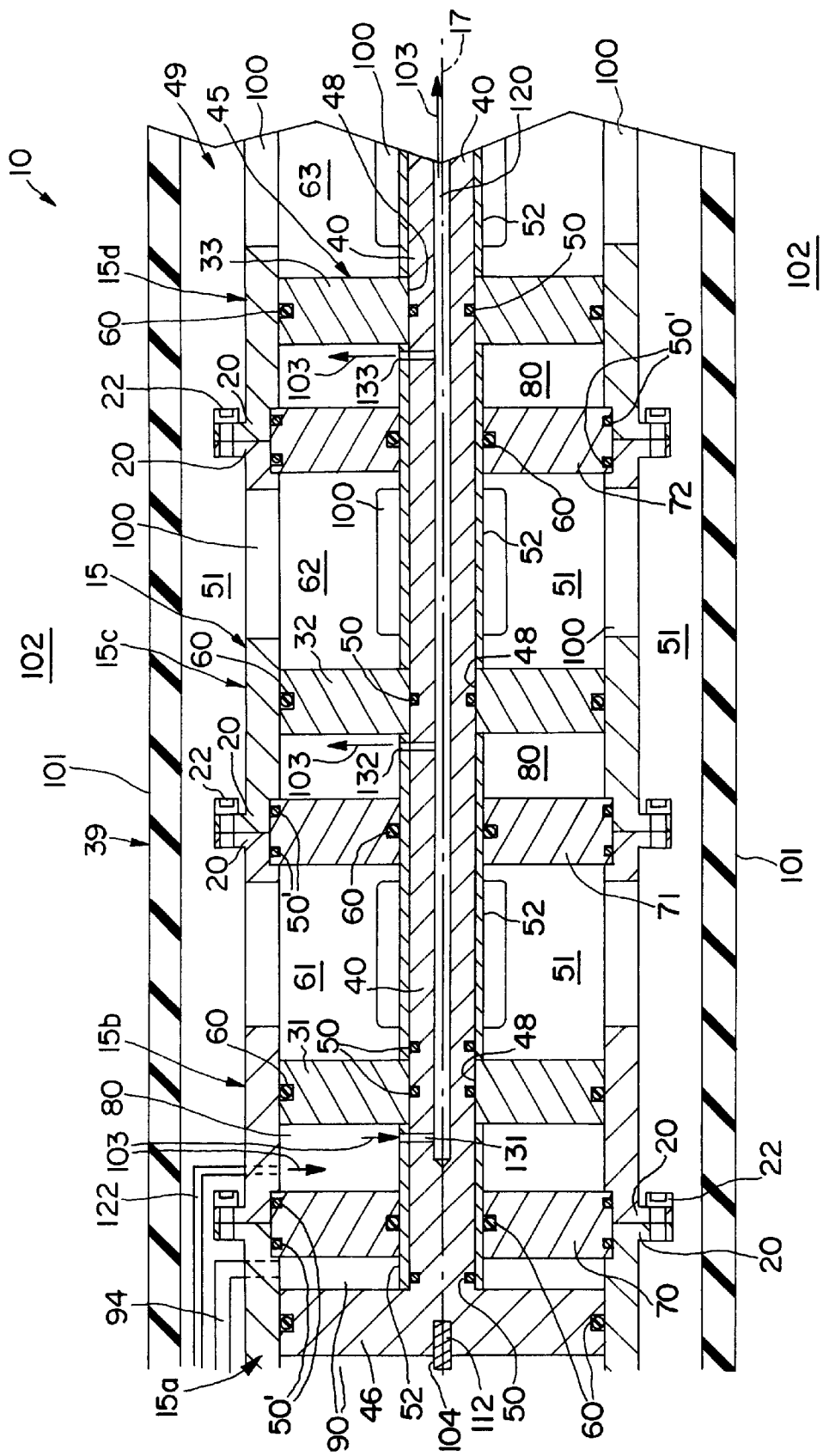
FIG. 2B is an enlarged elevational axial sectional view of the portion of this energy source immediately aft of the front portion shown in FIG. 2A. By positioning FIG. 2B immediately adjacent to FIG. 2A, a viewed will be laying out a sectional view extending aft from the streamlined nose to the third group of output ports.

Further Detailed Description of Systems, Apparatus and Assembly Techniques Employed in the Presently Preferred Embodiment of the Invention:

The streamlined heads 12 and 14 are attached to the tubular wall 15 by a ring of corrosion resistant machine screws 16 (only two of these screws are seen in FIG. 2A). These heads 12 and 14 and the tubular wall 15 are constructed of suitably strong corrosion resistant material, for example corrosion resistant stainless steel, such as stainless steel type 304. For joining the cylinder sections 15a to 15i in end-to-end axial alignment, their fore and aft axial ends are provided with encircling, radially protruding flanges 20, as shown in FIGS. 2A and 2B. The respective pairs of abutting flanges 20 are connected together as shown in these two Figures by a plurality of bolts 22 arranged in a bolt circle.

Within the tubular cylinder wall 15 is the multi-piston assembly 45 comprising a plurality of identical vibration output pistons 31, 32, 33, 34, 35, 36, 37, and 38. It is noted that respective vibration output pistons 31 through 38 are positioned within respective modular cylinder sections 15b through 15i. Although this illustrative preferred embodiment of the invention is shown having a total of eight such pistons 31 through 38, each positioned within a respective one of eight cylinders, it is to be understood that this modular construction enables a greater or lesser total number of such pistons and cylinders to be incorporated in such a marine vibratory sound source 10, as may be beneficial for usage in various marine seismic exploration and/or surveying applications.

As explained above, to vibrate these eight vibration output pistons 31 to 38 back and forth in an axial direction within their respective cylinders 15b through 15i, there is a long piston rod 40 extending longitudinally, i.e., concentrically, along the axis 17 of the vibratory marine seismic energy source 10. This long piston rod 40 extends through all of cylinders 15b through 15i. Its aft end 42 projects into a chamber 44 enclosed within the streamlined tail head 14. This tail head chamber 44 is filled with air at a relatively low pressure, for example in a range from about 35 pounds per square inch (psi) to about 115 psi as described above. Fixedly secured to the forward end of the long piston rod 40 is the actuator piston 46 shown in FIGS. 1A and 2A. For example, this actuator piston 46 is integrally attached to the forward end of piston rod 40, as shown most clearly in FIG. 2A. A portion of this actuator piston is shown in FIG. 1A with steel sectioning lines for indicating that this actuator piston together with its rod 40 are made of stainless steel, for example of corrosion-resistant type 17-4PH.

In order to mount the circular vibration output pistons 31 to 38 onto the long piston rod 40, these pistons each have a concentric central hole 48 (FIG. 2B) snugly fitting onto their rod 40. Each piston is sealed to rod 40 by a suitable seal for providing a fluid-tight sealing relation between each annular piston and the rod extending therethrough. For example, as is shown in FIGS. 2A and 2B, this sealing relation is formed by suitable O-rings 50 seated in grooves encircling the rod 40. These O-rings 50 are formed of tough resilient material, for example such as polyurethane having a Durometer rating in a range from about 70 to about 90.

For retaining the vibration output pistons 31 to 38 in axially spaced positions on their long rod 40, there are a plurality of piston-positioning sleeves 52 as is shown in FIGS. 2A and 2B. These sleeves 52 snugly encircle the rod 40 between successive pistons. A first of these sleeves 52 extends between the rear surface of the actuator piston 46 and the front surface of the first vibration output piston 31. The second sleeve 52 extends between the rear surface of the first vibration output piston 31 and the front surface of the second vibration output piston 32, and so forth along the rod 40, with each annular piston 31 to 37 being captured fore and aft between a pair of these sleeves 52. The aftmost vibration output piston 38 is captured between the last piston-positioning sleeve (which is not separately drawn in FIG. 1B) and a piston retainer nut 54 (FIG. 1B) which is engaged onto a screw-threaded portion 43 of rod 40. This threaded portion 43 of rod 40 on which retainer nut 54 is engaged has a slightly smaller diameter than the main length of rod 40 in front of threaded portion 43 so this threaded portion can be passed freely through the central holes 48 in pistons 31 to 38 during assembly of this multi-piston structure 45, as will be explained more fully later.

The aft end portion 42 of rod 40 has a slightly smaller diameter than the threaded portion 43, for allowing the nut to be slid freely along rod portion 42 to the threaded portion 43 for threading thereon. The rod end portion 42 is smooth for stroking back and forth within a central hole 56 (FIG. 1B) in a bulkhead wall 58. An O-ring 60 seated in a groove in the hole surface of bulkhead 58 provides a sliding seal relation between rod end portion 42 and the encircling hole surface. For example, this sliding-seal O-ring 60 is formed of polyurethane having a durometer rating in a range of about 90 to about 95, thus being slightly tougher than the stationary-seal O-rings 50.

The perimeters of vibration-output pistons 31 to 38 and actuator piston 46 have sliding seal O-rings 60 (FIGS. 2A and 2B), acting like "piston rings" captured in peripheral grooves encircling these pistons. Also, there is a sliding-seal O-ring 60 encircling shaft 104, being captured in a groove in the bulkhead 88 for sealing the forward end of actuator piston cylinder chamber 90.

The technique will now be described for assembling the circular cylindrical tubular body 15 comprising modular cylinder sections 15b to 15i with the multi-piston 45 comprising vibration-output pistons 31 to 38 together with the multi-cylinder chambers 61 to 68 and together with the bulkheads 70 to 77 and tail end bulkhead 58. The shaft 104 is connected to the actuator piston 46 by screwing its threaded end into a central screw-threaded socket 112 (FIG. 2A) in the front of this piston. The slug 106 is not yet screwed onto the front end of shaft 104. This shaft is inserted through the seal 60 in the bulkhead 88, and then the slug 106 is installed on shaft 104 in its position in the forward portion of cylinder section 15a. The cable 96 and hoselines 78, 82 and 99 are inserted through the seals in the towing head 12, and their ends are appropriately connected to respective components of the assembly 18. The hydraulic pipelines 93 and 94 are installed. Then, the towing head is attached by screws 16 to the cylinder section 15a with an O-ring seal 50 captured in an inner groove in the shoulder 47 for sealing the head chamber 105.

Next, the first piston-positioning sleeve 52 is placed onto the piston rod 40 being inserted through the cylinder wall bulkhead 70 and abutting against the actuator piston 46. An O-ring 50 in a groove in the rod 40 seals this first sleeve 52 to the rod. A sliding-seal O-ring 60 encircles this first sleeve 52 being seated in a groove in a central hole in the annular cylinder wall bulkhead 70. And, the modular cylinder section 15b is mounted to the forward cylinder section 15a by bolts 22. The inner surface of these mated sections 15a and 15b near their respective flanges 20 were machined to form a rabbet joint for capturing the periphery of the annular cylinder wall bulkhead 70 in this rabbet joint. This rabbet joint is sealed to the perimeter of the bulkhead 70 by a pair of O-rings 50' seated in a pair of grooves in the periphery of this bulkhead.

In sequence, the next modular cylinder section 15c (FIG. 2B) is mounted to the preceding cylinder section 15b employing the same technique as explained in the preceding paragraph, with a second piston-positioning sleeve 52 having been placed onto the piston rod 40 and having the next annular cylinder wall bulkhead 71 slid onto the piston rod 40 from its tail end 42 (FIG. 1B). The periphery of annular cylinder wall bulkhead 71 is captured in the rabbet joint in the inner surfaces of the cylinder sections 15b and 15c near their mating flanges 20 secured together by bolts 22. This rabbet joint is sealed to the perimeter of the bulkhead 71 by a pair of O-rings 50' seated in a pair of peripheral grooves in this bulkhead.

This modular assembly technique proceeds step-by-step in sequence until the final piston-positioning sleeve (not drawn in FIG. 1B) has been positioned on the piston rod 40 between the last two annular pistons 37 and 38. The cylinder wall bulkhead 77 is captured and sealed in a rabbet joint (not drawn) between modular cylinder sections 15h and 15i. The final vibration output piston 38 is secured in position against the final piston-positioning sleeve by tightening the pistons retainer nut 54 onto the threaded rod portion 43 firmly against the last piston 38.

The tail head 14 is assembled to the aft end of the final cylinder wall section 15i by the machine screws 16 with the aft end 42 of the piston rod 40 protruding through a central hole in the final bulkhead 58 in sliding-sealed relation therewith provided by a seal 60 as previously described.

Lastly, the elastomeric bladder 39 is slid into position around the assembled vibrator seismic energy source 10 and is secured by clamp rings 41 with the source held under water for filling the bladder chamber and cylinders with water 51.

Water-filling fittings (not shown) can be provided penetrating through the bladder wall for conveniently filling and draining the water 51 from the bladder chamber 49.

In order to feed low-pressure compressed air 103 into all of the low-pressure air cushions 80 and into the tail head chamber 44, there is a low-pressure air distribution passage 120 (FIG. 2B) extending axially concentrically within the piston rod 40. As shown in FIG. 2A, a low-pressure air line 122 has its forward end communicating with towing head chamber 105, which is supplied with low-pressure air 103 flowing into this chamber 105 from a hoseline 99 coming from the towing ship. This low-pressure air line 122 has its aft end communicating with the frontmost air cushion located between the bulkhead 70 and the frontmost vibration-output piston 31, thereby supplying low-pressure compressed air 103 to the frontmost air cushion 80. A first radial drill hole 131 (FIG. 2A) connects this frontmost air cushion 80 with the forward end of axial passage 120. By virtue of the fact that it is only the front end (FIG. 2A) of the first piston-positioning sleeve 52 which is sealed to the piston rod 40 by a seal 50, low-pressure air 103 can flow inwardly from air cushion 80 past the aft end of this sleeve 52 and then can flow a short distance under the sleeve for entering this radial passage 131 and thence into the axial passageway 120.

Conversely, as shown in FIG. 2B, a second radial drill hole 132 feeds air outwardly from axial passageway 120 underneath the aft end of the second piston-positioning sleeve and out past its aft end for feeding into the second air cushion 80.

There are six more (not shown in FIGS. 1A and 1B) of such radial drill holes communicating with the axial passageway 120 for feeding low-pressure air into the six remaining air cushions 80. As indicated in FIG. 1B, low-pressure air 103 flows from the aft end of the axial passageway into the tail chamber 44.

Operating Advantages of the Preferred Embodiment of the Invention:

In this presently preferred embodiment of the invention, the exterior seismic energy transmitting surface 101 of the elastomeric bladder 39 has a substantial diameter "D" as shown in FIG. 1B. For example, this exterior diameter D of the outer surface 101 of elastomeric bladder 39 as shown is about 18.00 inches as shown (about 45.7 centimeters). Moreover, the length "L" of this elastomeric bladder is substantial, being 118.50 inches as shown, which is about 9.875 feet, equal to about 301 centimeters (about 3.01 meters). It is noted that the overall length of this source 10 from the very front of streamlined towing head 12 to the very tail end of streamlined tail head 14 is substantial, being about 180 inches (about 15 feet) overall as shown, which is about 457.2 centimeters (about 4.57 meters).

The surface area of a right circular cylindrical surface having a diameter D and a length L is calculated by the following geometric formula:

$$\text{Surface area} = \pi DL \quad 1)$$

Substituting 18.00 inches for D and 118.50 inches for L with $\pi$ taken as 3.1416, yields the following calculation:

$$\begin{aligned}\text{Surface} &= 3.1416 \times 18.00 \times 118.50 \quad 2)\\ &= 6{,}701 \text{ square inches of}\\ &\quad \text{vibrational coupling area in}\\ &\quad \text{contact with the surrounding}\\ &\quad \text{water body 102.}\end{aligned}$$

In contrast to this large vibrational coupling area of about 6,700 sq. in., many impulsive marine seismic airguns in use today have four discharge ports providing a total impulsive-sound-coupling area in a range of about 30 sq. in. to about 40 sq. in. Compared to 40 sq. in., the area of 6,700 sq. in. is more than one hundred sixty-seven times (167×) larger for providing enormously enhanced coupling with surrounding water for much more effective generation and propagation of seismic energy sound signals into the surrounding body of water 102.

Further, it is to be understood that these vibrator sources 10 can be made smaller or larger in diameter, for example having a bladder with a diameter in the range of about 6 inches to about 36 or more inches.

Moreover, since vibrator seismic energy devices have largely replaced impulsive seismic energy sources, such as dynamite, for seismic exploration on land, it may be possible that marine seismic exploration scientists will find this streamlined, readily towable vibrator marine seismic energy source to be more advantageous than impulsive marine seismic airguns. This vibrator source 10 as shown has a vibrational-water-contacting transmitting surface more than two orders of magnitude larger than discharge ports of many impulsive marine seismic airguns in use today.

Further, vibrational output signals propagated from the bladder surface 101 can be swept-frequency seismic energy signals and/or pulse-coded signals, such that data collected and analyzed from employing such swept-frequency vibratory marine seismic signals and/or collected and analyzed from employing pulse-coded vibratory seismic signals, for example such as frequency-shift pulse coding, will provide enhanced understanding of sub-bottom formations being explored.

Although a specific embodiment of the invention has been disclosed and explained herein in detail, it is to be understood that this detailed disclosure is for purposes of illustration. This disclosure is not to be construed as limiting the scope of the invention, since the described embodiment may be changed in details as will become understood through experience by those skilled in the art in order to adapt for particular applications this streamlined, vibratory, readily-towable marine seismic energy source for creating and propagating intense, swept-frequency and/or pulse-coded signals in a body of water, without departing from the true spirit and scope of the following claims and equivalents of the claimed elements.

I claim:

1. A vibrator marine seismic energy source, comprising:
   an elongated circular cylinder having an axis concentric therewith;
   said elongated circular cylinder having a plurality of cylinder chambers therein including an actuator cylinder chamber;
   an axially reciprocatable piston in each of the cylinder chambers;
   an elongated piston rod connected to the pistons and extending along the axis;
   an actuator piston in the actuator cylinder chamber connected to the elongated piston rod;
   an elongated circular cylindrical elastomeric bladder encircling said elongated circular cylinder and being spaced radially outward from said elongated circular cylinder;
   said bladder being connected at its fore and aft ends to said elongated circular cylinder for providing an elongated annular bladder chamber extending longitudinally between the elastomeric bladder and the elongated circular cylinder;

said bladder chamber being filled with water;

a streamlined towing head mounted on the fore end of said elongated circular cylinder;

said streamlined towing head extending forward from the fore end of said the elastomeric bladder;

a streamlined tail head mounted on the aft end of said elongated circular cylinder;

said streamlined tail head extending aft from the aft end of the elastomeric bladder;

said elongated circular cylinder having a plurality of ports therein at each of said cylinder chambers;

said ports opening out to the elongated annular bladder chamber for providing communication between water in each of said cylinder chambers and water in the elongated annular bladder chamber; and a remotely controllable hydraulic liquid circuit for feeding high-pressure hydraulic liquid into the actuator cylinder alternately fore and aft of the actuator piston while allowing displaced hydraulic liquid to escape alternately from aft and fore of the actuator piston chamber for axially vibrating the actuator piston for axially vibrating the pistons for vibrating water out and in through said ports for radially vibrating the elastomeric bladder for propagating vibratory seismic energy from the outer surface of the bladder.

2. A vibrator marine seismic energy source as claimed in claim 1, wherein:

said cylinder chambers have low-pressure compressed-air cushions therein in their opposite ends from their ends containing water.

3. A vibrator marine seismic energy source as claimed in claim 2, further comprising:

said elongated piston rod having an axial passage extending longitudinally therein and communicating with said low-pressure air cushions for supplying low-pressure compressed air to said air cushions; and said axial passage communicating at its aft end with the interior of the tail head chamber.

4. A vibrator marine seismic energy source as claimed in claim 3, wherein:

a source of low-pressure compressed air communicates with a chamber in said streamlined towing head for supplying low-pressure compressed air into said chamber; and said axial passage communicates with said chamber in said streamlined towing head for supplying low-pressure compressed air into said axial passage.

5. A vibrator marine seismic energy source as claimed in claim 4, wherein:

said remotely-controllable hydraulic liquid circuit includes a servo valve manifold mounted in said chamber in said streamlined towing head; and a servo valve mounted on said servo valve manifold.

6. A vibrator marine seismic energy source as claimed in claim 5, wherein:

said remotely-controllable hydraulic liquid circuit produces swept-frequency vibrations and pulse-coded vibrations of the exterior surface of the elongated circular cylindrical elastomeric bladder.

7. A vibrator marine seismic energy source as claimed in claim 6, wherein:

said elongated circular cylindrical elastomeric bladder has an exterior diameter "D" of about 18.00 inches; and said bladder has a length "L" of about 118.5 inches, thereby having a large exterior vibrational-coupling area of about 6,700 square inches in contact with the surrounding body of water for effective generation and propagation of vibrational seismic energy signals into the surrounding body of water.

8. A vibrator marine seismic energy source towable behind an exploration vessel for performing marine seismic exploration, said source comprising:

an elongated circular cylindrical wall having an axis extending longitudinally therein concentric with said cylindrical wall;

a plurality of cylinder wall bulkheads within said circular cylindrical wall;

said cylinder wall bulkheads being at axially-spaced positions along said axis for dividing space within said cylindrical wall into a plurality of axially aligned axially-spaced cylinder chambers;

said cylinder wall bulkheads having central holes concentric with said axis;

an elongated piston rod extending along said axis through said central holes in said cylinder wall bulkheads;

seals encircling the elongated piston rod at said cylinder wall bulkheads for providing sliding seals between the piston rod and the cylinder wall bulkhead;

a plurality of pistons mounted on the elongated piston rod with a respective piston being positioned in each of said cylinder chambers;

said pistons dividing said cylinder chambers into a low-pressure air cushion sub-chamber located on a first predetermined side of said pistons and a water-filled sub-chamber located on a second predetermined side of said pistons;

an actuator piston connected to the piston rod and being located in an actuator cylinder chamber within said elongated cylinder wall;

an elongated cylindrical elastomeric bladder surrounding said elongated cylindrical wall and being spaced radially outwardly from said wall;

fore and aft end portions of said bladder being connected in waterproof relation to fore and aft portions of said source for defining an elongated bladder chamber encircling the elongated cylinder wall;

a streamlined towing head mounted to a front of the elongated circular cylindrical wall and extending forward beyond the fore end portion of the elastomeric bladder;

a streamlined tail head mounted to an aft portion of the elongated circular cylindrical wall and extending aft beyond an aft end portion of the bladder;

said elongated bladder chamber being filled with water;

said water-filled sub-chambers having a plurality of ports in said cylinder wall for providing communication between said water-filled sub-chambers and said water-filled bladder chamber; and a hydraulic circuit remotely controllable from the exploration vessel for feeding hydraulic liquid under pressure into said actuator cylinder chamber alternately fore and aft of the actuator piston for axially reciprocating said actuator piston with vibrator motion;

the hydraulic circuit allowing displaced hydraulic liquid to escape alternately from aft and fore of the vibrator actuator piston;

thereby axially vibrating said plurality of pistons for vibrating water from said sub-chambers out and in through said ports communicating with said bladder chamber for vibrating the exterior surface of the elastomeric bladder in contact with a surrounding body of water for transmitting vibrator seismic energy into the surrounding body of water.

9. A vibrator marine seismic energy source as claimed in claim 8, wherein:

said piston rod has an axial passage therein communicating with the low-pressure air cushion sub-chambers; and a source of low-pressure compressed air communicating with said axial passage for supplying low-pressure compressed air to said air-cushion sub-chambers.

10. A vibrator marine seismic energy source as claimed in claim 8, wherein:

said pistons each have a central hole;

said elongated piston rod extends through the central holes in the pistons;

said central holes snugly fit the elongated piston rod; and the pistons are sealed to the elongated piston rod for isolating the low-pressure air cushion sub-chambers from the water-filled sub-chambers.

11. A vibrator marine seismic energy source as claimed in claim 10, further comprising:

a plurality of piston-positioning sleeves fitting closely onto the elongated piston rod;

said sleeves and said pistons alternating in sequence along the elongated piston rod with fore and aft ends of each sleeve respectively abutting against a piston in front of the sleeve and a piston aft of the sleeve for positioning the pistons in axially spaced relationship along the elongated piston rod; and a retainer nut screwed onto the piston rod aft of the aftmost piston for retaining the pistons and spacer sleeves on the elongated piston rod.

12. A vibrator marine seismic energy source as claimed in claim 8, wherein:

said elongated circular cylindrical wall is modular in construction, having respective cylinder sections extending between respective cylinder wall bulkheads;

successive cylinder sections have connections between them for joining them in axial alignment;

said connections between successive cylinder sections are located at perimeters of successive cylinder wall bulkheads; and the perimeters of the cylinder wall bulkheads are captured in position at said connections.

13. A vibrator marine seismic energy source as claimed in claim 12, wherein:

the perimeters of cylinder wall bulkheads are sealed to the modular cylinder sections at the connections between cylinder sections.

14. A vibrator marine seismic energy source as claimed in claim 8, wherein:

the exterior surface of said elastomeric bladder is vibrated with swept-frequency vibrations and pulse-coded vibrations.

15. A vibrator marine seismic energy source as claimed in claim 14, wherein:

the exterior surface of the elastomeric bladder has a diameter "D" of about 18 inches; and the bladder has a length "L" of about 118.5 inches, thereby providing the exterior surface of the bladder with a large vibrational-signal-coupling area of about 6,700 square inches in contact with the surrounding body of water.

16. A vibrator marine seismic energy source comprising:

a modular, multi-cylinder assembly including a plurality of cylinder chambers arranged in axial alignment;

a multi-piston assembly having an axially extending piston rod with a plurality of pistons connected to the piston rod and with a piston in each of said cylinder chambers;

an elongated circular cylindrical elastomeric bladder encircling said modular, multi-cylinder assembly and being spaced radially outward therefrom;

a forward end of said elongated circular cylindrical elastomeric bladder being mounted on a forward portion of said modular multi-cylinder assembly;

an aft end of said bladder being mounted on an aft end of said modular, multi-cylinder assembly, thereby forming an elongated bladder chamber;

a streamlined towing head mounted on a forward end of said modular, multi-cylinder assembly and extending forward therefrom beyond said bladder;

a streamlined tail head mounted on an aft end of said modular, multi-cylinder assembly extending aft beyond said bladder;

said elongated bladder chamber being filled with water;

said modular, multi-cylinder assembly having a plurality of ports in each of said cylinder chambers for providing communication between the cylinder chambers and said water-filled bladder chamber;

said cylinder chambers being filled with water;

said modular, multi-cylinder assembly including an actuator cylinder chamber having an actuator piston therein connected to said multi-piston assembly;

a remotely-controllable high-pressure hydraulic liquid source mounted within said streamlined towing head; and said hydraulic liquid source being in communication with said actuator cylinder chamber in front of and behind said actuator piston for axially vibrating said actuator piston, thereby axially vibrating the multi-piston assembly for vibrating water out and in through said ports for vibrating water in said bladder chamber for vibrating said elongated bladder for propagating vibrator seismic energy signals from an exterior surface of the elastomeric bladder.

17. A vibrator marine seismic energy source as claimed in claim 16, wherein:

said remotely-controllable high-pressure hydraulic liquid source axially vibrates said actuator piston with swept frequencies in a range up to about 200 Hz.

18. A vibrator marine seismic energy source as claimed in claim 16, further characterized by:

an axial passageway in said piston rod communicating with low-pressure compressed air within said streamlined towing head; and said axial passageway communicating with said cylinder chambers on an opposite side of each piston from the side in contact with the water in the cylinder chamber, thereby creating a low-pressure compressed air cushion on the opposite side of each piston from the side in contact with water in the cylinder chamber.

19. A vibrator marine seismic energy source as claimed in claim 16, wherein:

said source has an overall sleek fish-like configuration having an overall axial length from the front end of the streamlined towing head to the aft end of the streamlined tail head of about 15 feet.

20. A vibrator marine seismic energy source as claimed in claim 18, further comprising:

a multi-piston assembly position sensor mounted in said streamlined towing head and being responsive to the position of the multi-piston assembly for providing an electric signal to the towing vessel for enabling synchronization of the vibrator source with companion sources being towed.

* * * * *